United States Patent
Brent et al.

(10) Patent No.: US 10,708,012 B1
(45) Date of Patent: Jul. 7, 2020

(54) WIDEBAND SUBCARRIER WIRELESS TRANSCEIVER CIRCUITS AND SYSTEMS

(71) Applicants: Jason Brent, Foothill Ranch, CA (US); Dengkui Zhu, Beijing (CN); Ping Liang, Newport Coast, CA (US)

(72) Inventors: Jason Brent, Foothill Ranch, CA (US); Dengkui Zhu, Beijing (CN); Ping Liang, Newport Coast, CA (US)

(73) Assignee: RF DSP Inc., Irvine, CA (US)

( * ) Notice: Subject to any disclaimer, the term of this patent is extended or adjusted under 35 U.S.C. 154(b) by 25 days.

(21) Appl. No.: 16/271,808

(22) Filed: Feb. 9, 2019

(51) Int. Cl.
*H04L 27/26* (2006.01)
*H04J 11/00* (2006.01)
*H04B 7/024* (2017.01)
*H04L 5/00* (2006.01)
*H04W 72/04* (2009.01)

(52) U.S. Cl.
CPC ........ *H04L 5/0007* (2013.01); *H04L 27/2628* (2013.01); *H04W 72/0446* (2013.01)

(58) Field of Classification Search
CPC ............. H04W 52/42; H04W 72/0413; H04W 72/046; H04W 84/18; H04W 88/02; H04W 16/14; H04W 24/02; H04W 28/06; H04W 4/06; H04L 5/0023; H04L 5/0037; H04L 12/2854; H04L 27/2601; H04L 27/2602; H04L 27/2614; H04L 27/2628; H04L 27/2633; H04L 41/0226; H04L 45/24; H04L 47/10; H04L 5/0007; H04L 5/0021; H04L 5/0035; H04L 5/0073; H04L 1/0025; H04L 1/0041; H04L 27/2605; H04L 27/2607
See application file for complete search history.

(56) References Cited

U.S. PATENT DOCUMENTS

| | | | | |
|---|---|---|---|---|
| 6,359,938 | B1* | 3/2002 | Keevill | H04L 1/0054 370/206 |
| 8,488,442 | B1* | 7/2013 | Narasimhan | H04L 25/0228 370/210 |
| 2004/0146123 | A1* | 7/2004 | Lai | H04L 25/067 375/329 |
| 2005/0147186 | A1* | 7/2005 | Funamoto | H04L 27/2662 375/324 |
| 2005/0163094 | A1* | 7/2005 | Okada | H04L 27/2657 370/343 |
| 2006/0280113 | A1* | 12/2006 | Huo | H04L 5/0048 370/208 |
| 2009/0232079 | A1* | 9/2009 | Khandekar | H04L 27/261 370/329 |

* cited by examiner

*Primary Examiner* — Sai Aung
(74) *Attorney, Agent, or Firm* — Guosheng Wang; United States Research and Patent Firm

(57) ABSTRACT

This invention discloses methods and circuits of wideband wireless transmitting and/or receiving by combining multiple RF transmitters and/or receivers, or multiple transceivers, each of which has a narrower bandwidth, e.g., producing a RF transmitter and receiver or a RF transceiver whose signal bandwidth is the sum or approximately the sum, e.g., slightly less than the sum, of the signal bandwidth of the multiple RF transmitters and/or receivers, or multiple RF transceivers. The embodiments apply in wireless communication systems with orthogonal or approximately orthogonal subcarrier type of modulation (OSM), e.g., Orthogonal Frequency Division Multiplexing (OFDM).

20 Claims, 10 Drawing Sheets

US 10,708,012 B1

WIDEBAND SUBCARRIER WIRELESS TRANSCEIVER CIRCUITS AND SYSTEMS

FIELD OF INVENTION

This invention relates to wideband wireless communication systems, and more particularly, to methods and circuits for wideband wireless transceiver chips and circuits with orthogonal or approximately orthogonal subcarrier type of modulation by combining multiple transceivers each of which has a narrower bandwidth.

BACKGROUND

New technologies such as autonomous vehicles, virtual/augmented reality in mobile environment, mobile robots, industrial Internet of Things (IoT), mobile and distributed artificial intelligence, etc., demand much wider bandwidth for the next generation of mobile communication systems to provide mobile wireless connectivity that are significantly faster and more reliable than what's available in prior art. The 3rd Generation Partnership Project (3GPP) has defined the 5G New Radio (NR), a candidate technology for potential inclusion in the IMT-2020 radio interface recommendation(s) by ITU-R, that uses up to 100 MHz bandwidth for sub 6 GHz frequency bands and 400 MHz bandwidth for millimeter wave (mmWave) frequency bands with scalable subcarrier spacing for a single carrier for the next generation or the $5^{th}$ generation (5G) wireless communication systems, e.g., at 28 GHz carrier central frequency with 3168 usable subcarriers under 120 KHz subcarrier spacing. Carrier aggregation in NR will require radio frequency (RF) transceivers with even wider bandwidth, e.g., over 1 GHz, to handle even wider bandwidth signals. With the much wider bandwidth than that in the 4G Long Term Evolution (LTE), the wideband communication systems can achieve higher peak throughput and spectral efficiency, lower latency, and better user experience. Moreover, the wide bandwidth enables more efficient use of resources than the existing carrier aggregation (CA) mechanism in 4G-LTE.

One of the major challenges of wideband communication systems is the difficulty for hardware to achieve precise and robust performance in such a wide bandwidth, e.g., the flatness of the response of the RF path. Another challenge is the high cost and high power consumption of analog-to-digital conversion (ADC) and digital-to-analog conversion (DAC) in a RF transceiver. For example, for systems with wider than 100 MHz bandwidth, sampling speed faster than 1G sample per second and bit resolution with more than 10 bits are desired. The possibility of using low bit resolution, e.g., one-bit ADC, has been studied recently to cut down system complexity and power consumption. However, even with very sophisticated algorithms, one-bit ADCs fundamentally has poor performance at medium and high SNRs. To address this issue, this patent presents invention that implement wideband transceivers using multiple narrower-bandwidth transceivers working in parallel so that the power consumption and transceiver complexity increases linearly instead of exponentially as the wireless signal bandwidth grows.

BRIEF DESCRIPTION OF DRAWINGS

Embodiments of this invention as well as additional implementations would be more clearly understood as a result of the following detailed description of the various aspects of the invention when taken in conjunction with the drawings. Like reference numerals refer to corresponding parts throughout the several views of the drawings.

SUMMARY OF THE INVENTION

Figure 1:
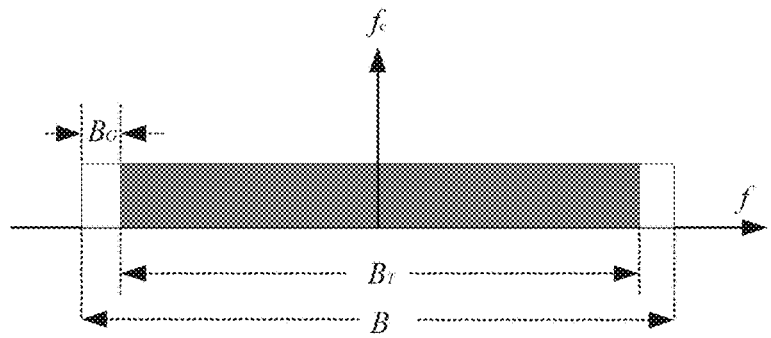
FIG. 1 shows the frequency band used for a wireless communication system with orthogonal or approximately orthogonal subcarrier type of modulation (OSM), e.g., Orthogonal Frequency Division Multiplexing (OFDM).

This invention discloses apparatuses and methods of wireless transmission and/or reception of a wireless signal of transmission bandwidth $B_T$ with carrier frequency $f_c$ using an Orthogonal or approximately orthogonal Subcarrier type of Modulation (OSM) with a Transformed Time Domain (TTD) transformation and its inverse ITTD size of $N_{FFT}$ comprising K (K≥2) transmitting paths and/or M (M≥2) receiving paths of OSM signals, wherein the $k^{th}$, k=1 to K, transmitting path and/or $k^{th}$, k=1 to M, receiving path has a signal band with a bandwidth $B_{Tk}<B_T$ which is located next to the signal band(s) of the $(k-1)^{th}$ path and/or the $(k+1)^{th}$ path;

a local oscillator (LO) for each path wherein the frequency of the LO of the $k^{th}$ path is the center frequency of the signal band of the $k^{th}$ path;

an analog interface that feeds the outputs of the K transmitting paths to a combiner that combines the K transmitting paths to produce a transmitting signal of bandwidth $B_T$ with carrier frequency $f_c$ and/or that receives the M signals from a splitter that divides a received signal of bandwidth $B_T$ with carrier frequency $f_c$ into M paths to feed into the M receiving paths; and a digital interface that feeds each of K segments divided from a sequence of N (N≤$N_{FFT}$) samples of the wireless signal of bandwidth $B_T$ to one of the K transmitting paths and/or receives a segment of samples from each of the M receiving paths which are to be concatenated with the segments from other receiving paths to form a sequence of N ($N \leq N_{FFT}$) samples of the wireless signal of bandwidth $B_T$, wherein the length of each segment $N_k$ is proportional to the bandwidth $B_{Tk}$ of the path and the samples of each segment undergoes an $N_k$-point ITTD transformation and addition of Cyclic Prefix (CP) in a transmitting path and/or removal of CP and an $N_k$-point TTD transformation in a receiving path.

The embodiments may further have the following features: The signal bands of all the K transmitting paths and/or all the M receiving paths may cover the entire or approximately the entire bandwidth $B_T$ centered at carrier frequency $f_c$; the sum of all $N_k$ equals to $N_{FFT}$; the $B_{Tk}$ of the K transmitting paths are equal, $N_k = N_{FFT}/K$, the carrier frequency and the signal band of the $k^{th}$ transmitting path are $$f_c - \frac{B_T}{2} + \frac{(2k-1)B_T}{2K}$$

of and $$\left[f_c - \frac{B_T}{2} + \frac{(k-1)B_T}{K}, f_c - \frac{B_T}{2} + \frac{kB_T}{K}\right]$$

for k=1, ..., K; and/or the $B_{Tk}$ of the M receiving paths are equal, $N_k = N_{FFT}/K$, the carrier frequency and the signal band of the $k^{th}$ receiving path are $$f_c - \frac{B_T}{2} + \frac{(2k-1)B_T}{2M} \text{ and } \left[f_c - \frac{B_T}{2} + \frac{(k-1)B_T}{M}, f_c - \frac{B_T}{2} + \frac{kB_T}{M}\right]$$

for k=1, ..., M; the OSM is Orthogonal Frequency Division Multiplexing (OFDM) and the TTD and ITTD transformations are implemented as Fast Fourier Transform (FFT) and Inverse FFT (IFFT); and/or integrating the K transmitting paths and/or the M receiving paths in a circuit chip.

The embodiments may further comprise the combiner and/or the splitter; a first digital processing module for each path that performs the ITTD and/or TTD and CP processing of each of the segments, and a second digital processing module that divides a sequence of N ($N \leq N_{FFT}$) samples of the wireless signal of bandwidth $B_T$ into K segments for transmitting and/or concatenates M segments into a sequence of N ($N \leq N_{FFT}$) samples of the wireless signal of bandwidth $B_T$ for receiving.

The embodiments may further comprise integrating the K transmitting paths, the M receiving paths, the first and second digital processing modules, the combiner and the splitter in an integrated circuit chip; or using n<K transmitting paths and/or m<K receiving paths are selected if the transmission bandwidth of the wireless signal is less than $B_T$.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Hereafter the terms wireless transceiver, RF transceiver or simply transceiver are used interchangeably. A RF transceiver may contain either a transmitter (Tx) path or a receiver (Rx) path or both paths, and a transceiver chip or circuit may comprise one or more RF transceivers.

Figure 2:
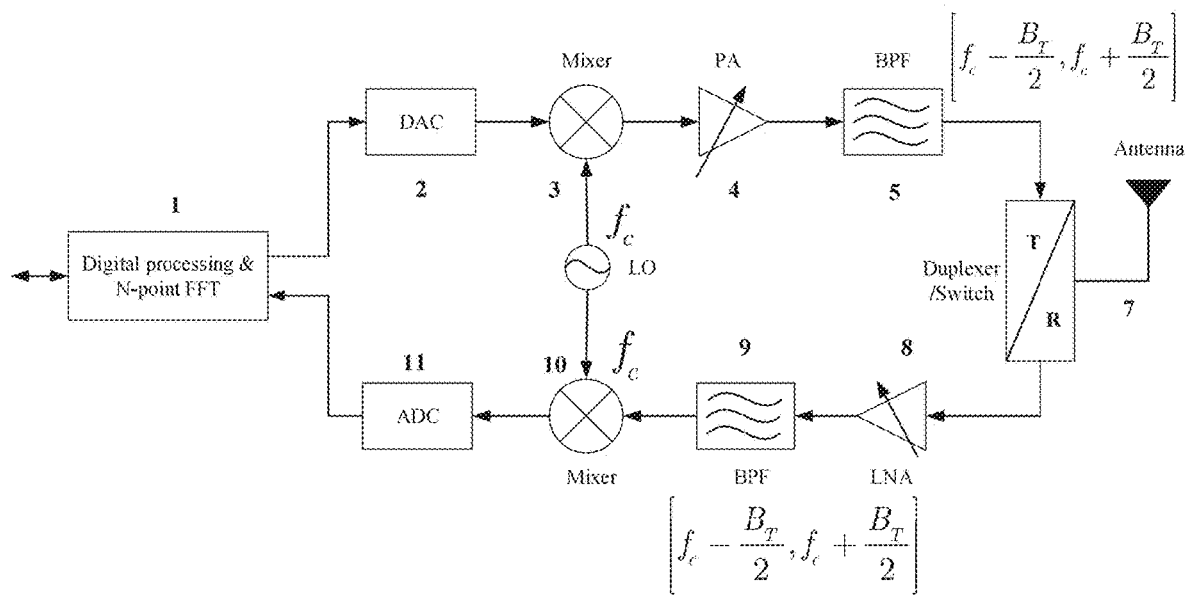
FIG. 2 shows a transceiver for a single antenna in conventional TDD systems at a base station (BS).

This invention discloses methods and circuits of wideband wireless transmitting and/or receiving by combining multiple RF transmitters and/or receivers, or multiple transceivers, each of which has a narrower bandwidth, e.g., producing a RF transmitter and receiver or a RF transceiver whose signal bandwidth is the sum or approximately the sum, e.g., slightly less than the sum, of the signal bandwidth of the multiple RF transmitters and/or receivers, or multiple RF transceivers. The embodiments apply in wireless communication systems with orthogonal or approximately orthogonal subcarrier type of modulation (OSM), e.g., Orthogonal Frequency Division Multiplexing (OFDM). Hereafter, the term OFDM is used to represent all types of modulation with orthogonal or approximately orthogonal subcarriers. As an example, if each of the narrower bandwidth RF transmitter and/or receivers, or transceiver, has a continuous signal bandwidth of 200 MHz with a sampling frequency at or above the Nyquist rate of a signal with 200 MHz continuous bandwidth but below the Nyquist rate of a signal with 400 MHz or 800 MHz continuous bandwidth, embodiments of this invention will produce a RF transmitter and/or receiver or a RF transceiver, that has a continuous signal bandwidth of 800 MHz by combining four of the narrower bandwidth RF transmitters and/or receivers, or transceivers. Note that no ADC or DAC with a sampling frequency at or above the Nyquist rate of a signal with 800 MHz continuous bandwidth is used. Therefore, the power consumption and transceiver complexity increase linearly in the embodiments of this invention, instead of exponentially if sampling at or above the Nyquist rate of an 800 MHz wide continuous bandwidth signal is used as in prior art. One embodiment implements a wideband transceiver using multiple narrower-bandwidth transceivers working in parallel so that the power consumption and transceiver complexity increases linearly instead of exponentially as the wireless signal bandwidth grows. Consider an OFDM-based Time Division Duplex (TDD) wireless communication system with bandwidth B at carrier central frequency $f_c$ as shown in FIG. 1, where the bandwidth B can be as large as several hundred MHz or even several to dozens of GHz. In OFDM systems, the actual used bandwidth for data transceiving or the transmission bandwidth $B_T$ is usually less than the bandwidth B, using a bandwidth $$B_G = \frac{B - B_T}{2}$$

as a guard-band at both sides of the transmission frequency band. FIG. 2 shows the block diagram of a prior art transceiver at a Base Station (BS). For the transmitter, in the digital processing module 1, after channel coding, constellation modulation, and data to subcarrier mapping, signals are passed to the $N_{FFT}$-point Inverse Fast Fourier Transform (IFFT) module for OFDM modulation. Then, the Cyclic Prefix (CP) is added to the output of the IFFT, and finally window function is applied to the signals for shaping filtering. The output signals of digital processing module pass through DAC 2, mixer 3, Power Amplifier (PA) 4, Band-Pass Filter (BPF) 5, and duplexer or switch 6 sequentially before being radiated into the air by antenna 7, where the DAC working frequency and the Local Oscillator (LO) frequency are $f_{st}$ and $f_c$ respectively. For the receiver, the Radio Frequency (RF) signals received from antenna 7 pass through the duplexer or switch 6, Low Noise Amplifier (LNA) 8, BPF 9, mixer 10 and ADC 11 sequentially, where the ADC working frequency and mixer working frequency are $f_{sr}$ and $f_c$ respectively. The output of ADC is passed to the digital processing module for CP remove, $N_{FFT}$-point FFT OFDM demodulation, data-to-subcarrier de-mapping, signal detection, constellation demodulation, channel decoding, etc. Note that the analog signal processing in FIG. 2 may be integrated into a RF chip, or the entire transceiver may be integrated into a mixed signal chip. Note that the Fourier Transform and Inverse Fourier Transform, implemented by FFT and IFFT operations in an OFDM system, can be replaced by a more general transformation, e.g., Transformed Time Domain (TTD), which transforms a signal from the time domain to another domain that can be any domain besides frequency domain, and inverse TTD (ITTD) which transforms the signal in the transformed domain to the time domain, for communication systems using an orthogonal or approximately orthogonal subcarrier type of modulation. When the other domain is the frequency domain, TTD becomes FFT and ITTD becomes IFFT. Hereafter, the pair of terms FFT and TTD, and the pair of term IFFT and ITTD will be used interchangeably.

TDD Systems

Figure 3:
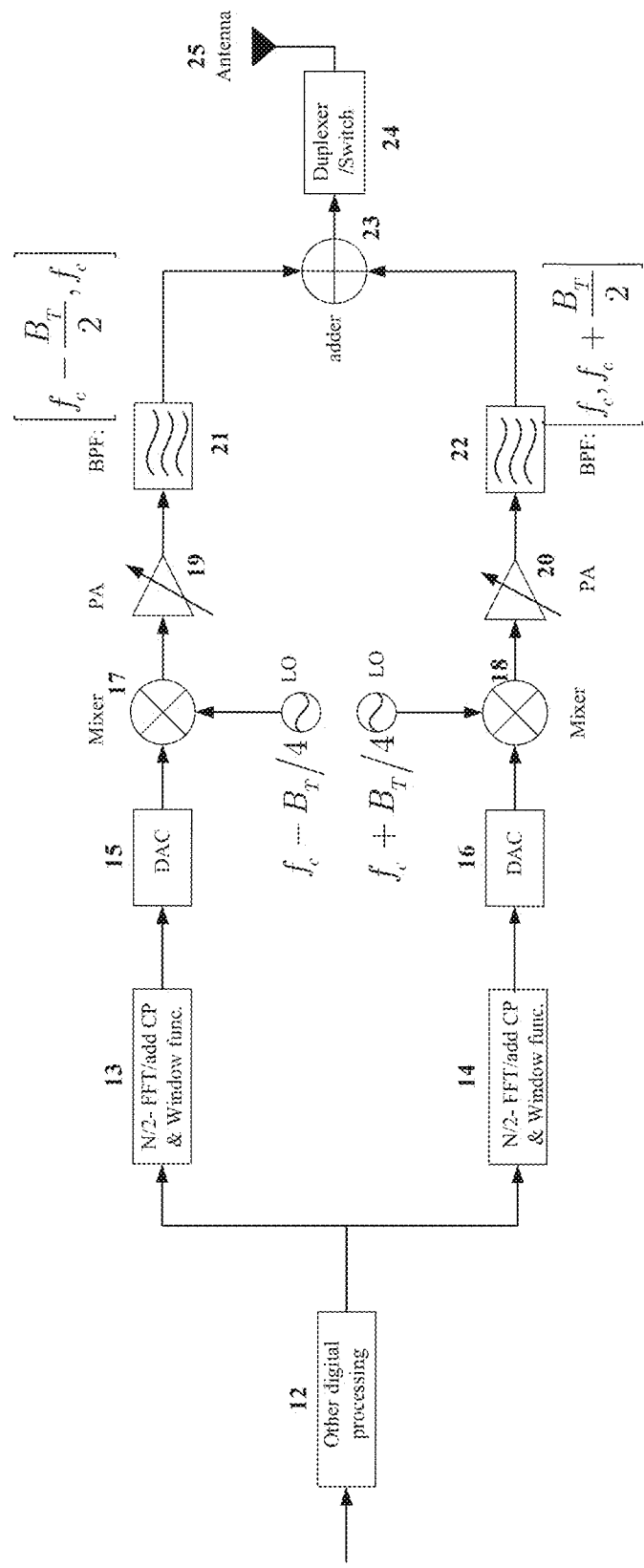
FIG. 3 shows two transmitters in parallel transmitting to a single antenna in a TDD system.
Figure 4:
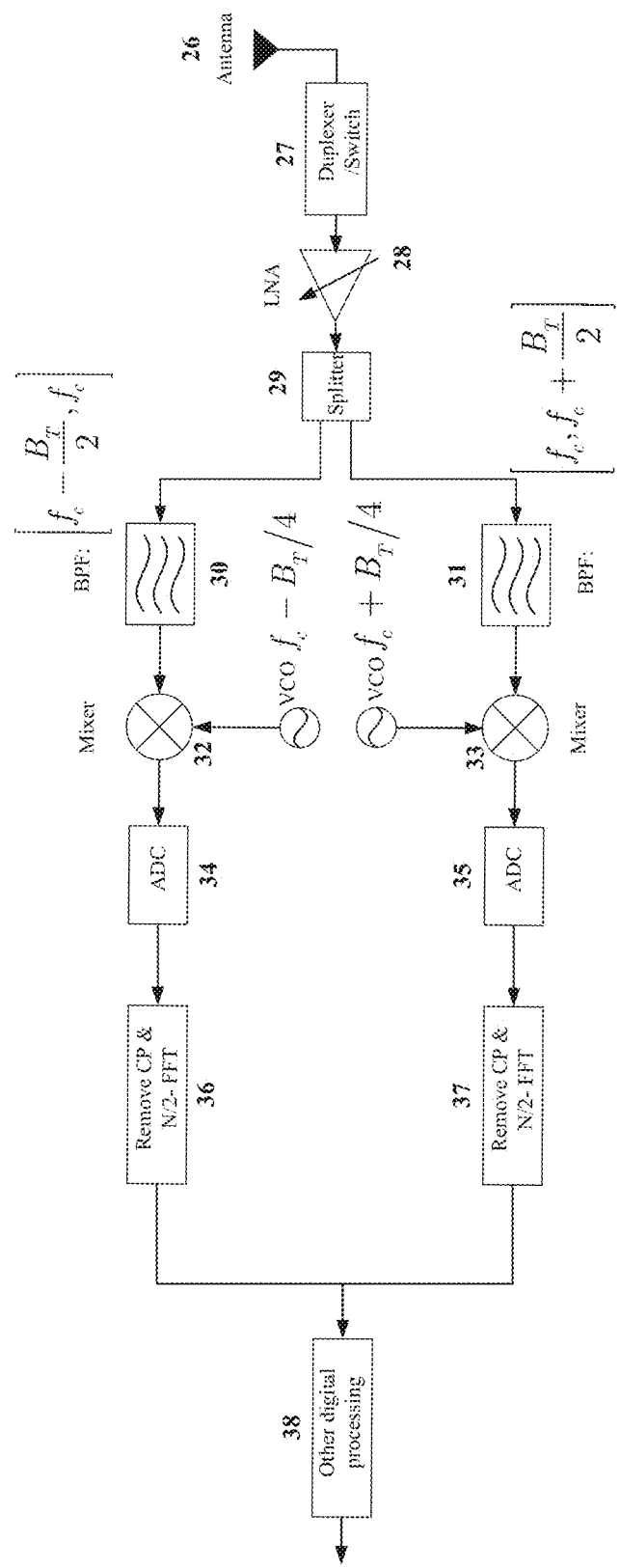
FIG. 4 shows two receivers in parallel receiving from a single antenna in a TDD system.
Figure 5:
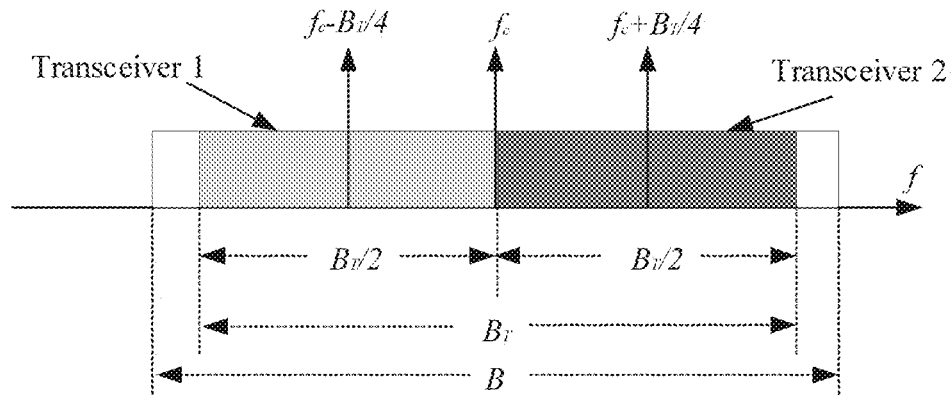
FIG. 5 shows a frequency band allocation for two parallel transceivers

This invention uses multiple transmitters, receivers and/or transceivers in parallel to realize an apparatus in a TDD OFDM wireless communication system that has a larger bandwidth B than each of the transceivers. One embodiment of a transmitter and a receiver with two parallel paths are shown in FIG. 3 and FIG. 4 respectively, where each of the two transmitters and two receivers has a transmission bandwidth $B_T/2$ as shown in FIG. 5. For transmission in the downlink (DL), after constellation modulation and data-to-subcarrier mapping, 12, every N ($N \le N_{FFT}$) samples are divided into two sets with N/2 samples in each set, e.g., dividing into the first N/2 and next N/2 samples and then passed to the two parallel paths with modules 13 and 14 for $N_{FFT}/2$-point IFFT, adding CP and shaping filtering. After that, these two signal streams pass through the DACs 15 and 16, mixers 17 and 18, PAs 19 and 20, and BPFs 21 and 22 in parallel before they are superposed together again at the analog adder or combiner module 23, where the transmission frequency band for the two transmitters are configured as $$\left[f_c - \frac{B_T}{2}, f_c\right] \text{ and } \left[f_c, f_c + \frac{B_T}{2}\right]$$

respectively, and the LO frequencies for this two transmitters are $$f_c - \frac{B_T}{4} \text{ and } f_c + \frac{B_T}{4}$$

respectively. The effective sampling interval of the signal at 12 with bandwidth $B_T$ is twice or approximately twice of the sampling interval of DACs 15 and 16. Finally, the output signals of the combiner are passed to the duplexer or switch 24 and radiated into the air by the antenna 25. For reception in uplink (UL), as shown in FIG. 4, after passing through the duplexer or switch 27, the received RF signals at the antenna 26 are first amplified by LNA 28. Then, the output of LNA pass through a splitter 29, then two sets of BPFs 30 and 31, mixers 32 and 33, and ADCs 34 and 35 respectively, where the reception frequency bands of these two receivers are configured as $$\left[f_c - \frac{B_T}{2}, f_c\right] \text{ and } \left[f_c, f_c + \frac{B_T}{2}\right]$$

correspondingly, and the LO frequencies of these two receivers are $$f_c - \frac{B_T}{4} \text{ and } f_c + \frac{B_T}{4}$$

respectively. The effective sampling interval of the signal at 38 with bandwidth $B_T$ is twice or approximately twice of the sampling interval of ADCs 34 and 35. The output digital signals of each ADC are passed to the digital module 36 and 37 for CP removal and $N_{FFT}/2$-point FFT respectively. After that, these two sets of N/2 signals are concatenated for further processing 38.

Figure 6:
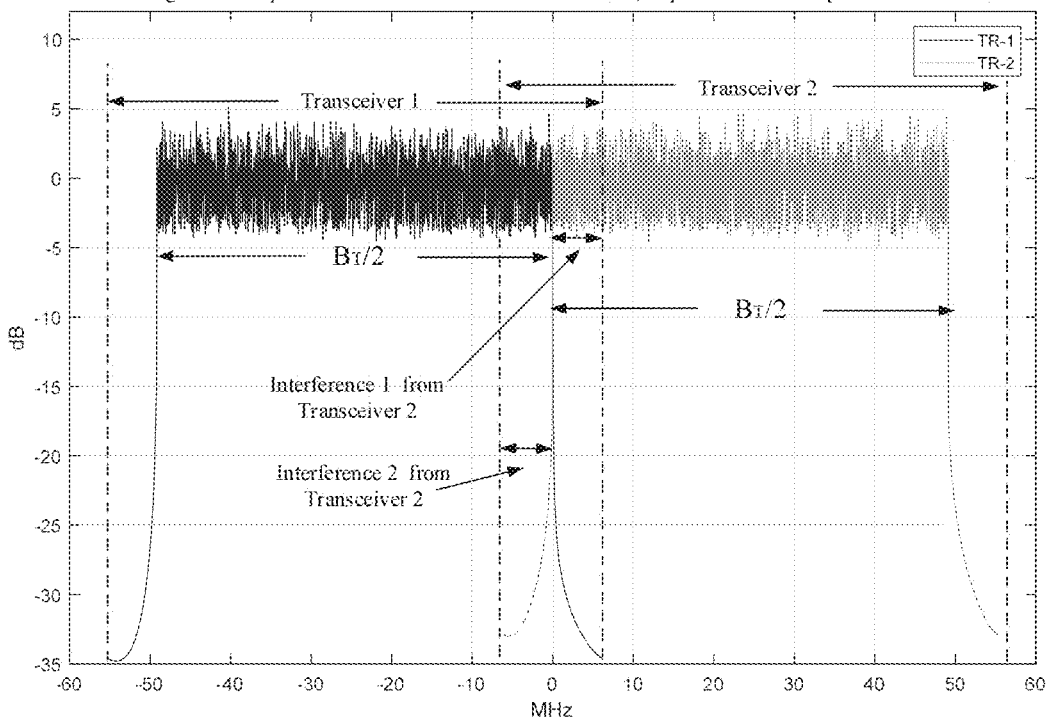
FIG. 6 shows am example of the signals in the frequency domain of the two parallel transceivers

For the examples in FIG. 3 and FIG. 4, FIG. 6 shows the signals in frequency domain for the two parallel transceivers, where the system bandwidth B is 100 MHz, the transmission bandwidth $B_T$ is 98.32 MHz, the FFT size for these two transceivers is 2048, and 205 subcarriers are reserved at both edges of each transmission bandwidth for guard-band. As shown in this figure, the interference suffered by Transceiver 1 (TR-1 in FIG. 6) mainly consists of two parts: the guard-band subcarriers of Transceiver 1 overlap with the data transmission subcarriers of Transceiver 2 (TR-2 in FIG. 6) termed as Interference 1 in the figure, and the data transmission subcarriers of Transceiver 1 overlap with the guard-band of Transceiver 2 termed as Interference 2 in the figure. For Interference 1, because of the subcarrier orthogonality of OFDM systems, the data subcarriers of Transceiver 1 would not be affected by the guard-band subcarriers. For Interference 2, because of the orthogonality of OFDM systems again, the signals leaked into the guard-band of Transceiver 2 can be ignored as shown in the figure, where the leaked signal is about 25-30 dB lower than the data signal of Transceiver 1. Therefore, with the proposed carrier frequency and transmission bandwidth allocation, the Transceiver 1 would not be interfered by Transceiver 2 and vice versa. For more than 2 transceivers case, similar analysis shows that the methods and circuits of this invention can expand the system bandwidth of an OFDM system multiple times by using multiple transceivers, i.e., transmitting and/or receiving circuits in parallel.

Figure 7:
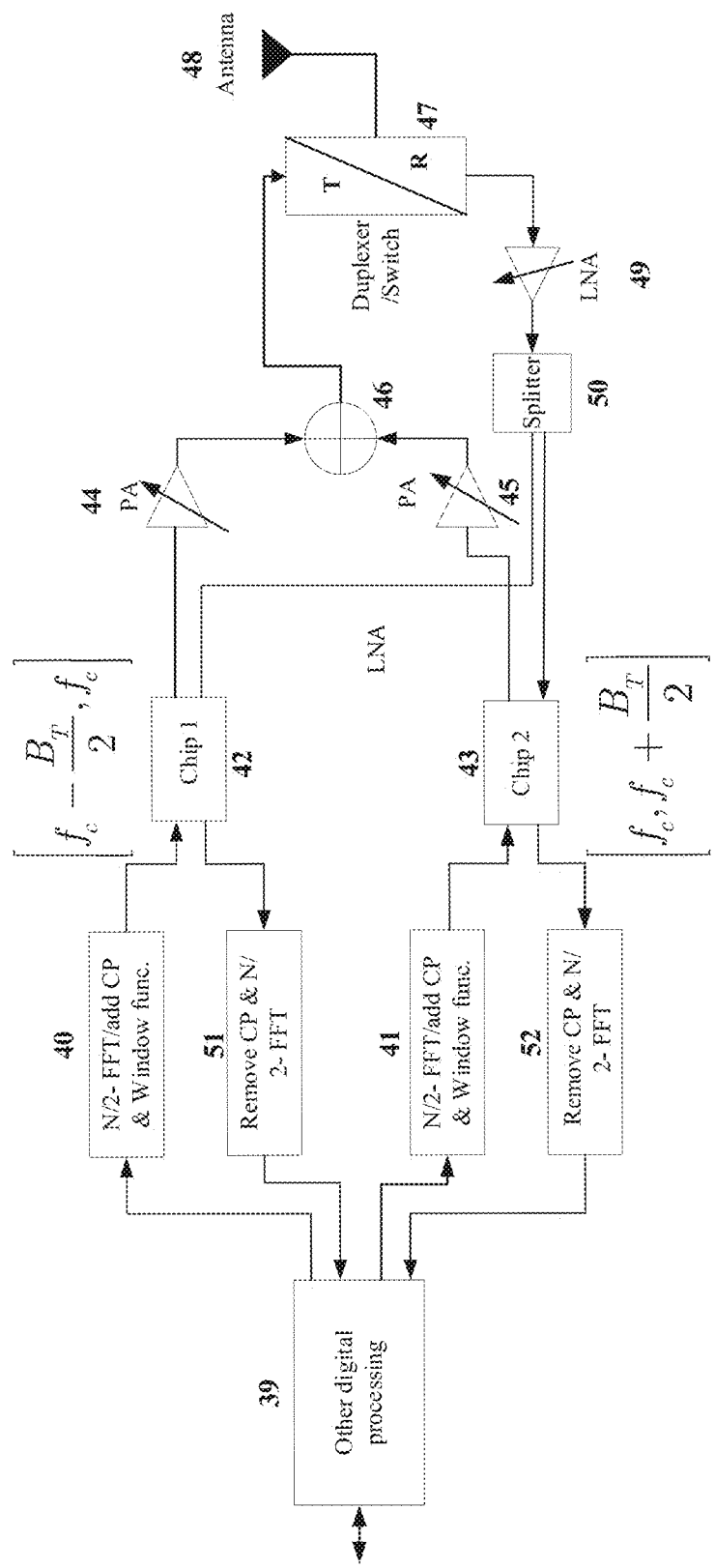
FIG. 7 shows a transceiver design with two parallel RF chips for a single antenna in a TDD system. This design can be used in a single RF chip where the two RF chips in the figure are interpreted as two circuit areas on the same die for a single RF chip.

Another exemplary embodiment uses two integrated RF transceiver chips to implement the two parallel transmission and reception as shown in FIG. 7, where one chip includes both RF signal transmission and reception with a transmission bandwidth of $B_T/2$ and the associated ADC and DAC. For transmission in DL, similar to the embodiment in the previous paragraph, after other digital processing like channel coding and constellation modulation 39, every N digital samples are first divided into two sets with N/2 samples in each set. Then, after applying $N_{FFT}/2$-point IFFT to each set for OFDM modulation, adding CP and shaping filtering 40 and 41, the signals in each set are passed to the associated RF chip 42 and 43 respectively. Finally, the output RF signals of these two chips are combined at combiner 46 before being passed to duplexer or switch 47 and radiated into the air by antenna 48. Optionally, the signals from the two chips may be amplified by two PAs 44 and 45 before being passed to the combiner. For reception in UL, the received RF signal passes through the duplexer or switch 47 and is divided into two paths through splitter 50. Optionally, to reduce the cascade noise figure, the signal from the antenna may be amplified by an LNA 49 first before being split into two paths for the two chips. Each of the splitter output path is fed into one of the two RF chips 42 and 43, and the output digital signals are sent to the following digital module 51 and 52 for CP removal and $N_{FFT}/2$-point FFT. After that, the useful signals in these two set are concatenated for further processing 39. The LO frequency and transceiving band for the first chip are $$f_c - \frac{B_T}{4} \text{ and } \left[f_c - \frac{B_T}{2}, f_c\right]$$

respectively, and for the second chip are $$f_c + \frac{B_T}{4} \text{ and } \left[f_c, f_c + \frac{B_T}{2}\right]$$

respectively. Note that other components besides these two chips may be employed in implementation of the RF transceivers, e.g., external PA or gain block for the transmitter and LNA for the receiver. This design applies to a single RF chip containing two transceivers where the two RF chips in FIG. 7 are interpreted as two circuit areas, each implementing a transceiver, on the same die for a single chip. Furthermore, some or all of the IFFT/FFT processing, CP and window functions and concatenation of signals in modules 39, 40, 41, 51 and 52 may also be integrated into the same chip that includes 42 and 43, or additionally includes some or all of 46, 47 and 49 in FIG. 7.

Figure 8:
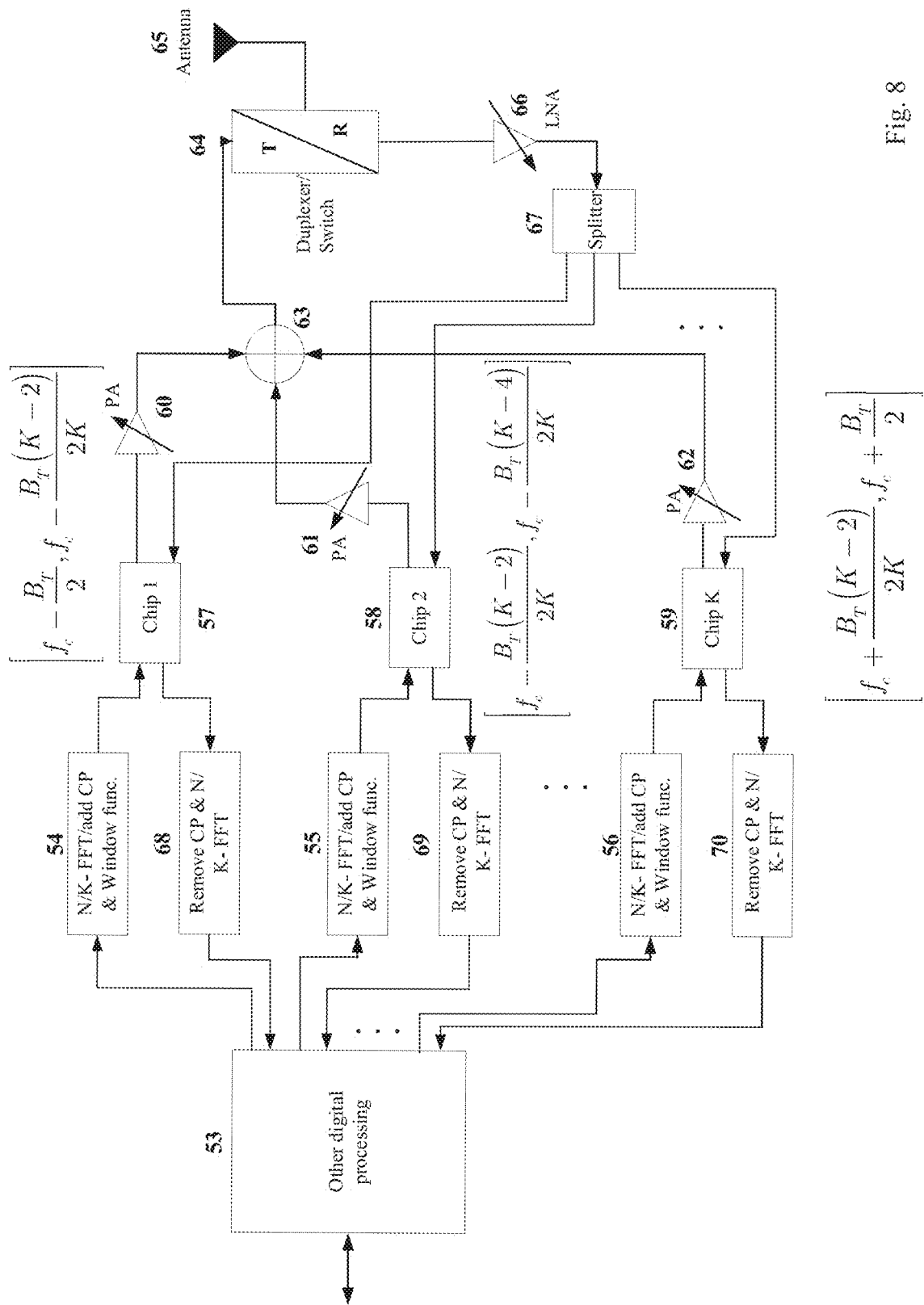
FIG. 8 shows a transceiver design with K parallel RF chips for a single antenna in a TDD system. This design can be used in a single RF chip where the K RF chips in the figure are interpreted as K circuit areas on the same die for a single RF chip.

Another embodiment extends the embodiments in FIGS. 3, 4 and 7 to K (K≥2) parallel transceivers or integrated RF transceiver chips to further increase the signal bandwidth by K times. An example using K RF transverse to implement a TDD OFDM wireless communication apparatus with bandwidth B is shown in FIG. 8, where the transmission bandwidth for each chip is $B_T/K$. For transmission in DL, similar to the example in the previous paragraph for K=2, after other digital processing 53, every N digital samples are first equally divided into K sets with N/K samples in each set, e.g., dividing into the first N/K, next N/K samples, etc. Then, after applying $N_{FFT}/K$-point IFFT to each set for OFDM modulation, adding CP and shaping filtering in 54, 55 and 56, each set of signals are passed to the associated RF chip 57, 58 and 59 respectively. Finally, the output RF signals of these K chips are combined at combiner 63 before being passed to duplexer/switch 64 and radiated into the air by the antenna 65. Optionally, the signals from these K chips may be amplified by PAs 60, 61 and 62 before being passed to the combiner. For reception in UL, the received RF signal after passing through the duplexer 64 are split 67 into K paths and fed into these K RF chips 57, 58 and 59 directly, and the output digital signals are sent to the following digital module for CP removal and $N_{FFT}/K$-point FFT 68, 69 and 70. Optionally, the signals from the antenna may be amplified by LNAs 66 before being split and passed to the K chips. After that, the useful signals in these K sets are concatenated for further processing 53. The LO frequency of the $k^{th}$, k= 1, ..., K, chip is $$f_c - \frac{B_T}{2} + \frac{(2k-1)B_T}{2K}$$

and the transceiving band of the $k^{th}$, k=1, ..., K, chip $$\left[f_c - \frac{B_T}{2} + \frac{(k-1)B_T}{K}, f_c - \frac{B_T}{2} + \frac{kB_T}{K}\right].$$

The effective sampling interval of the signal at 53 with bandwidth $B_T$ is K times or approximately K times of the sampling interval of the ADCs or DACs in chips 1 to K shown in block 57 to 59.

Other embodiments can be obtained by following the same or similar principle to achieve the same or similar effect but differ in details from FIGS. 3, 4, 7 and 8, e.g., more filters like anti-block filter for the receivers or other components not shown in the figures can be added, some components, e.g., filters, amplifiers, duplexer or switch, can be combined or removed, and some or all of the modules in the figures may be integrated into a single circuit chip.

FDD Systems

One embodiment uses multi-transceiver working in parallel to realized wider bandwidth signal transmission and reception in an FDD OFDM wireless communication apparatus, where the carrier frequency of DL and UL are $f_c^{dl}$ and $f_c^{ul}$, the bandwidths of the DL and UL are $B^{dl}$ and $B^{ul}$, the transmission bandwidths are $B_T^{dl}$ and $B_T^{ul}$, and the IFFT and FFT size for DL and UL are $N_{FFT}^{dl}$ and $N_{FFT}^{ul}$ respectively, where are $N_{FFT}^{dl} > N$ and $N_{FFT}^{ul} > N$.

Figure 9:
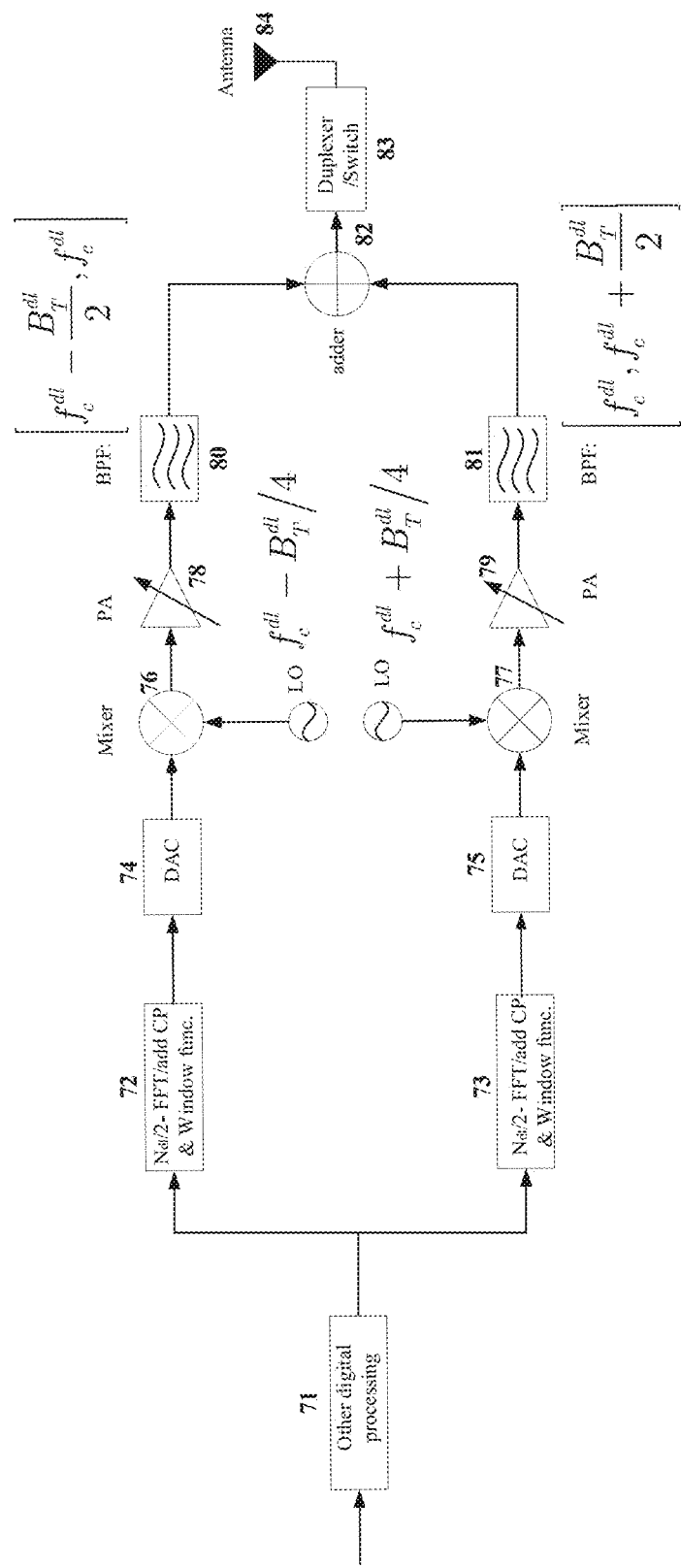
FIG. 9 shows two parallel transmitters transmitting to a single antenna in an FDD system.
Figure 10:
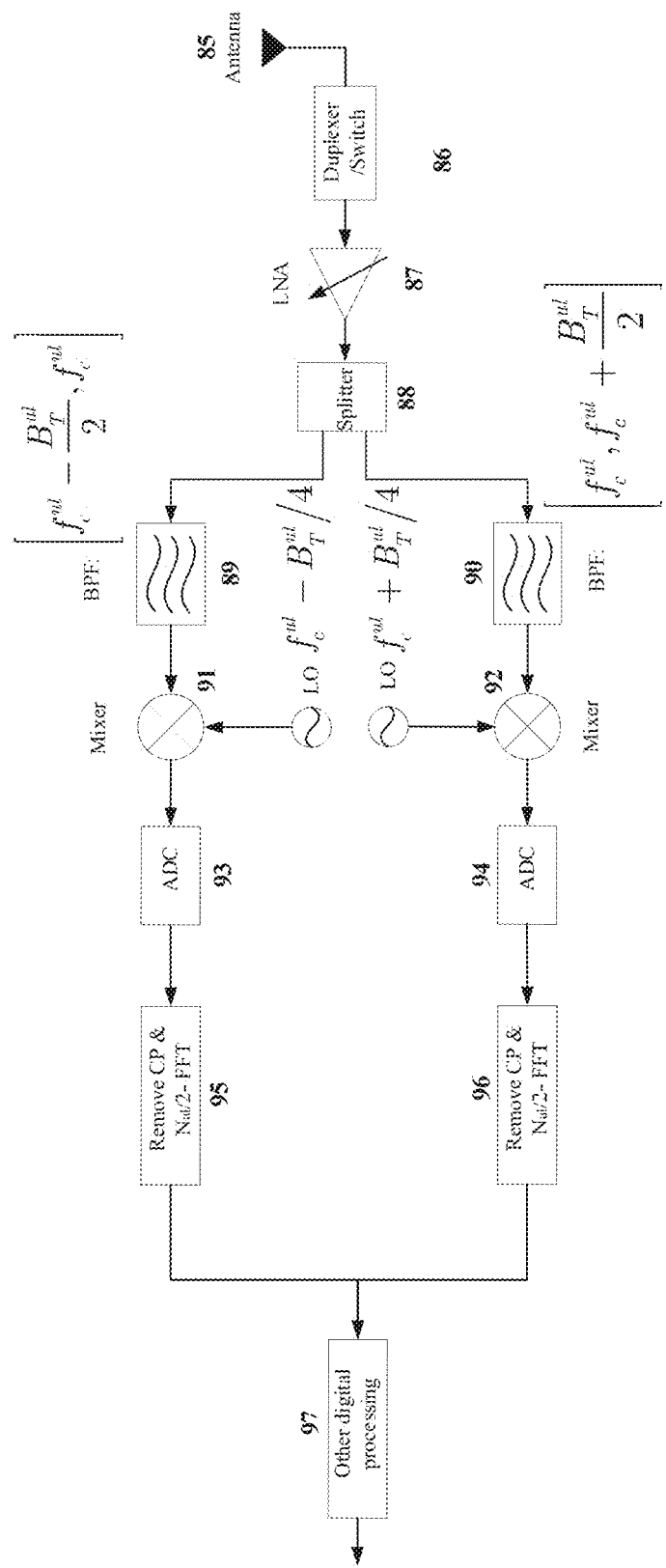
FIG. 10 shows two parallel receivers receiving from a single antenna in an FDD system.

An exemplary embodiment for DL transmission and UL reception in an FDD system is shown in FIG. 9 and FIG. 10 respectively, where two parallel transmitters are employed for DL transmission and two parallel receivers are employed for UL reception for a single antenna. For transmission in the DL, as shown in FIG. 9, after constellation modulation 71, every $N_{dl}$ samples are divided into two sets with $N_{dl}/2$ samples in each set and passed to the two parallel modules for OFDM modulation including $N_{FFT}^{dl}/2$-point IFFT, adding CP and shaping filtering in 72 and 73. After that, these two signal streams pass through the DACs 74 and 75, mixers 76 and 77. PAs 78 and 79 and BPFs 80 and 81 in parallel before they are combined at the combiner 82, where the carrier frequencies for the two transmitters are $$f_c^{dl} - \frac{B_T^{dl}}{4} \text{ and } f_c^{dl} + \frac{B_T^{dl}}{4}$$

respectively, and the transmission bands for the two transmitters are $$\left[f_c^{dl} - \frac{B_T^{dl}}{2}, f_c^{dl}\right] \text{ and } \left[f_c^{dl}, f_c^{dl} + \frac{B_T^{dl}}{2}\right]$$

respectively. Finally, the output signal of combiner goes to the duplexer 83 and radiated into the air by the antenna 84. For reception in UL, as shown in FIG. 10, after passing through the duplexer 86, the received RF signal at the antenna 85 is first amplified by LNA 87. Then, the output of LNA pass through a splitter 88, then the output of splitter passes through two sets of BPFs 89 and 90, mixers 91 and 92 and ADCs 93 and 94 respectively, where the carrier frequencies for the two transmitters are $$f_c^{ul} - \frac{B_T^{ul}}{4} \text{ and } f_c^{ul} + \frac{B_T^{ul}}{4},$$

and the reception frequency bands for the two receivers are $$\left[f_c^{ul} - \frac{B_T^{ul}}{2}, f_c^{ul}\right] \text{ and } \left[f_c^{ul}, f_c^{ul} + \frac{B_T^{ul}}{2}\right]$$

respectively. The output digital signals of each ADC are passed to the digital module 95 and 96 for OFDM demodulation including CP removal and $N_{FFT}^{ul}/2$-point FFT respectively. After that, these two $N_{ul}/2$ digital signals are concatenated for further processing 97. Note that in FDD systems, the bandwidth for UL and DL may not be symmetric. e.g., the bandwidth for UL (DL) may be less than that for DL (UL). Therefore, the number of parallel receivers/transmitters for UL (DL) may be less than that for DL (UL), e.g., only one receiver is employed for UL, where the OFDM demodulation in digital domain, the carrier frequency and the reception frequency band are configured as $N_{FFT}^{ul}$-point FFT, $f_c^{ul}$, and $$\left[f_c^{ul} - \frac{B_T^{ul}}{2}, f_c^{ul} + \frac{B_T^{ul}}{2}\right]$$

respectively, or only one transmitter is employed for DL, where the OFDM modulation in digital domain, the carrier frequency and the transmission frequency band are configured as $N_{FFT}^{dl}$-point FFT, $f_c^{dl}$, $$\left[f_c^{dl} - \frac{B_T^{dl}}{2}, f_c^{dl} - \frac{B_T^{dl}}{2}\right]$$

respectively.

Figure 11:
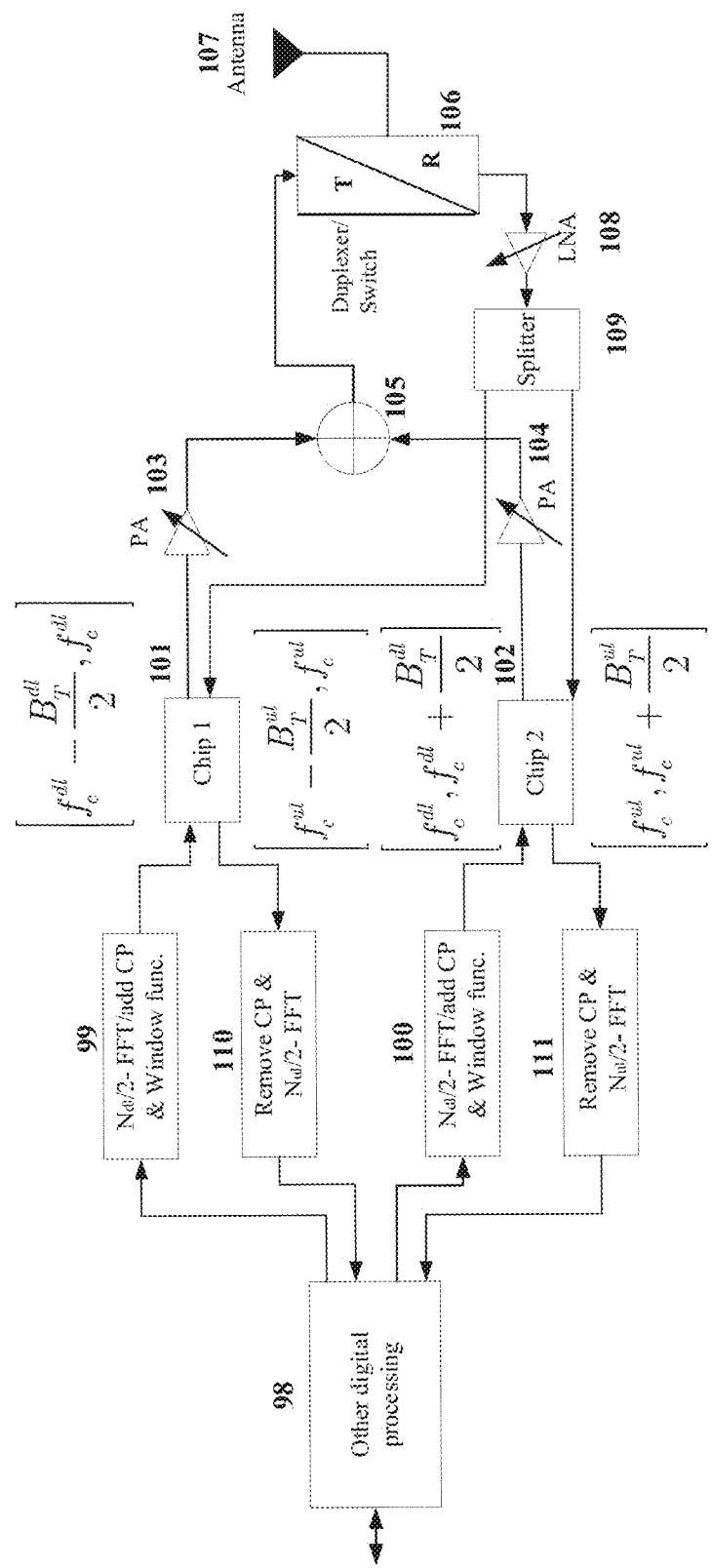
FIG. 11 shows a transceiver design with two parallel RF chips for a single antenna in an FDD system. This design can be used in a single RF chip where the two RF chips in the figure are interpreted as two circuit areas on the same die for a single RF chip.

Another embodiment uses two integrated RF chips to implement the two parallel transceivers as shown in FIG. 11, where the transmission bandwidth for each transmitter and receiver are $B_T^{dl}/2$ and $B_T^{ul}/2$ respectively. For transmission in DL, after other digital processing 98, every $N_{dl}$ digital signals are first divided into two sets with $N_{dl}/2$ signals in each set. Then, after OFDM modulation including $N_{FFT}^{dl}/2$-point IFFT, adding CP and shaping filtering 99 and 100, the signals in each set are passed to the associated RF chips 101 and 102. Finally, the output RF signals of these two chips are combined by the combiner 105 before being passed to duplexer or switch 106 and radiated into the air by the antenna 107, where the carrier frequencies for the two chips are $$f_c^{dl} - \frac{B_T^{dl}}{4} \text{ and } f_c^{dl} + \frac{B_T^{dl}}{4},$$

and the transmission frequency bands for the two chips are $$\left[f_c^{dl} - \frac{B_T^{dl}}{2}, f_c^{dl}\right] \text{ and } \left[f_c^{dl}, f_c^{dl} + \frac{B_T^{dl}}{2}\right]$$

respectively. Optionally, the signals from the two chips may be amplified by two PAs 103 and 104 before being passed to the combiner. For reception in UL, the received RF signal after passing through the duplexer 106 and splitter 109 is fed into the two RF chips 101 and 102, where the carrier frequencies for the two receivers are $$f_c^{ul} - \frac{B_T^{ul}}{4} \text{ and } f_c^{ul} + \frac{B_T^{ul}}{4},$$

and the reception frequency bands and the BPF bands for the two receivers are $$\left[f_c^{ul} - \frac{B_T^{ul}}{2}, f_c^{ul}\right] \text{ and } \left[f_c^{ul}, f_c^{ul} + \frac{B_T^{ul}}{2}\right]$$

respectively. The output digital signals of RF chips are used for the following OFDM demodulation including CP removal and $N_{FFT}^{ul}/2$-point FFT in 110 and 111. Optionally, the two signals from the duplexer may be amplified by an LNA 108 before being split and passed to the two chips. After that, the useful signals in these two sets are concatenated for further processing in 98. Similarly, for a non-symmetric FDD system, one of the DL transmission or UL reception function can be switched off in these two chips based on system bandwidth configurations, where the corresponding OFDM modulation/demodulation in digital domain, the carrier frequency and the transmission/reception frequency band are configured as $N_{FFT}^{dl}$-point FFT, $f_c^{dl}$ and $$\left[f_c^{dl} - \frac{B_T^{dl}}{2}, f_c^{dl} - \frac{B_T^{dl}}{2}\right]$$

or $N_{FFT}^{ul}$-point FFT, $f_c^{ul}$, and $$\left[f_c^{ul} - \frac{B_T^{ul}}{2}, f_c^{ul} - \frac{B_T^{ul}}{2}\right]$$

respectively. Furthermore, some or all of the IFFT/FFT processing, CP and window functions and concatenation of signals in modules 98,99, 100, 110, 111, may also be integrated into the same chip that includes 101 and 102, or additionally includes some or all of 105, 106 and 109 in FIG. 11.

Figure 12:
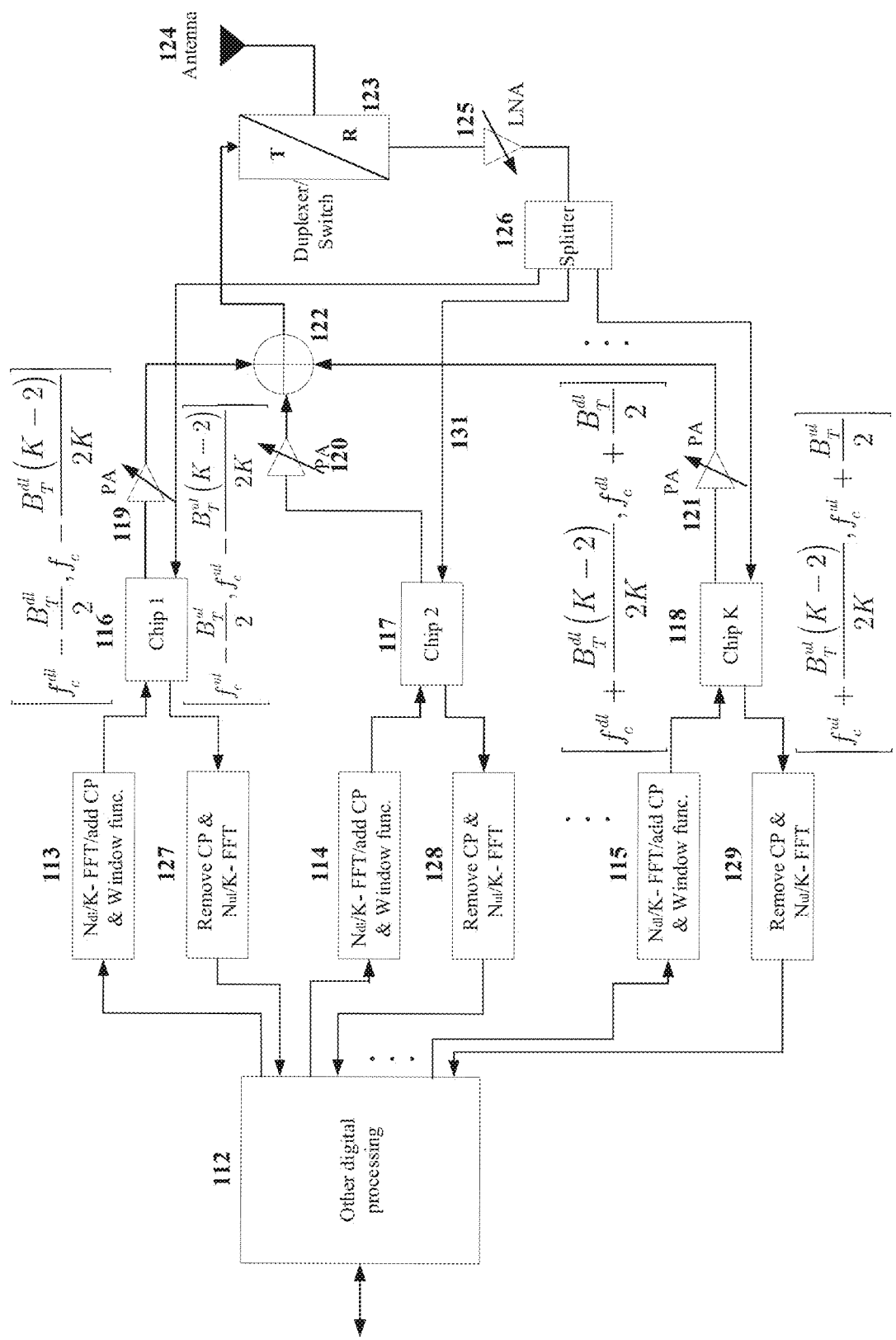
FIG. 12 shows a transceiver design with K parallel RF chips for a single antenna in an FDD system. This design can be used in a single RF chip where the K RF chips in the figure are interpreted as K circuit areas on the same die for a single RF chip.

The above embodiment can be extended to K (K≥2) integrated RF chips to further increase the signal bandwidth by K times by using K parallel transceivers as shown in FIG. 12, where the transmission bandwidth for each transmitter and receiver are $B_T^{dl}/K$ and $B_T^{ul}/K$ respectively. For transmission in DL, similar to the previous embodiment, after other digital processing in 112, every $N_{dl}$ digital samples are first equally divided into K sets with $N_{dl}/K$ samples in each set. Then, after $N_{FFT}^{dl}/K$-point IFFT for OFDM modulation, adding CP and shaping filtering in 113, 114 and 115, the signals in each set are passed to the associated RF chips 116, 117 and 118 respectively. Finally, the output RF signals of these K chips are superposed at the combiner or analog adder 122 before being passed to duplexer 123 and radiated into the air by the antenna 124, where the carrier frequency for the of the $k^{th}$, k=1, . . . , K chip is $$f_c^{dl} - \frac{B_T^{dl}}{2} + \frac{(2k-1)B_T^{dl}}{2K},$$

and the transmission frequency band of the $k^{th}$, k=1, . . . , K, chip is $$\left[ f_c^{dl} - \frac{B_T^{dl}}{2} + \frac{(k-1)B_T^{dl}}{K}, f_c^{dl} - \frac{B_T^{dl}}{2} + \frac{kB_T^{dl}}{K} \right]$$

respectively. Optionally, the signals from these K chips may be amplified by PAs 119, 120 and 121 before being passed to the combiner. For reception in UL, the received RF signal after passing through the duplexer 123 and a splitter 126 are feed into the K RF chips 116, 117 and 118, where the carrier frequencies for the of the $k^{th}$, k=1, . . . , K, chip is $$f_c^{ul} - \frac{B_T^{ul}}{2} + \frac{(2k-1)B_T^{ul}}{2K},$$

and the reception frequency band of the $k^{th}$, k=1, . . . , K, chip is $$\left[ f_c^{ul} - \frac{B_T^{ul}}{2} + \frac{(k-1)B_T^{ul}}{K}, f_c^{ul} - \frac{B_T^{ul}}{2} + \frac{kB_T^{ul}}{K} \right]$$

respectively. Optionally, the signals from the duplexer may be amplified by an LNA 125 before being split and passed to the K chips. The output digital signals of RF chips are sent to CP removal and $N_{FFT}^{ul}/K$-point FFT in 127, 128 and 129. After that, the useful signals in these K sets are concatenated for further processing in 112. Similarly, for a non-symmetric FDD system, only $K_0$($K_0$<K) may be reserved for the DL transmission or UL reception based on system configurations, i.e., the transmission or reception function in K-$K_0$ chips are switched off. As a result, the corresponding OFDM modulation/demodulation in digital domain, the carrier frequency and the transmission/reception frequency band for the reserved $K_0$ chips for the $k^{th}$, k=1, . . . , $K_0$, chip are configured as $N_{FFT}^{dl}/K_0$, -point FFT, $$f_c^{dl} - \frac{B_T^{dl}}{2} + \frac{(2k-1)B_T^{dl}}{2K_0}, \text{ and } \left[ f_c^{dl} - \frac{B_T^{dl}}{2} + \frac{(k-1)B_T^{dl}}{K_0}, f_c^{dl} - \frac{B_T^{dl}}{2} + \frac{kB_T^{dl}}{K_0} \right]$$

respectively for DL, and $N_{FFT}^{dl}/K_0$-point FFT, $$f_c^{ul} - \frac{B_T^{ul}}{2} + \frac{(2k-1)B_T^{ul}}{2K_0}, \text{ and } \left[ f_c^{ul} - \frac{B_T^{ul}}{2} + \frac{(k-1)B_T^{ul}}{K_0}, f_c^{ul} - \frac{B_T^{ul}}{2} + \frac{kB_T^{ul}}{K_0} \right]$$

respectively for UL.

Other embodiments can be obtained by following the same or similar principle to achieve the same or similar effect but differing in details from FIGS. 9, 10, 11 and 12, e.g., more filters like anti-block filters for receivers or other components not shown in the figures can be added, and some components, e.g., filters, amplifiers, duplexer or switch, can be combined or removed. Furthermore, some or all of the modules in the figures may be integrated into a single circuit chip.

In both the TDD and FDD embodiments, the apparatus or method does not need to use all K transmitting paths and/or all M receiving paths, for example, when the total throughput or the number of user terminals is smaller than the transmission bandwidth $B_T$ can support, or when the available band of spectrum is lower than transmission bandwidth $B_T$. In such cases, the embodiments can use less than K transmitting paths to transmit and/or less than M receiving paths to receive a wireless signal of transmission bandwidth less than $B_T$. The TDD and FDD system embodiments described above use transmitters, receivers and transceivers of same bandwidth, OFDM and IFFT or FFT as examples, the embodiments can be easily generalized to using transmitters, receivers and transceivers of different bandwidths, and using other orthogonal or approximately orthogonal subcarrier modulations, and ITTD and TTD transformations. In these generalized embodiments, the digital samples will be divided into segments that correspond to the bandwidth of each transmitter, receiver or transceiver, e.g., proportionally to the bandwidth, with more samples assigned to a transmitter, receiver or transceiver with a wider bandwidth, therefore an IFFT or ITTD, FFT or TTD of more points.

Although the foregoing descriptions of the preferred embodiments of the present inventions have described the fundamental novel features or principles of the inventions, it is understood that various omissions, substitutions, and changes in the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems and apparatuses, to achieve the advantages described herein, to achieve other advantages or to satisfy other objectives as well.

We claim:

1. An apparatus of wireless transmission and/or reception of a wireless signal of transmission bandwidth $B_T$ with carrier frequency $f_c$ using an Orthogonal or approximately orthogonal Subcarrier type of Modulation (OSM) with a Transformed Time Domain (TTD) transformation and its inverse ITTD size of $N_{FFT}$ comprising K (K≥2) transmitting paths and/or M (M≥2) receiving paths of OSM signals, wherein the $k^{th}$, k=1 to K, transmitting path and/or $k^{th}$, k=1 to M, receiving path has a signal band with a bandwidth $B_{Tk}$<$B_T$ which is located next to the signal band(s) of the $(k-1)^{th}$ path and/or the $(k+1)^{th}$ path;

a local oscillator (LO) for each path wherein the frequency of the LO of the $k^{th}$ path is the center frequency of the signal band of the $k^{th}$ path;

an analog interface that feeds the outputs of the K transmitting paths to a combiner that combines the K transmitting paths to produce a transmitting signal of bandwidth $B_T$ with carrier frequency $f_c$ and/or that receives the M signals from a splitter that divides a received signal of bandwidth $B_T$ with carrier frequency $f_c$ into M paths to feed into the M receiving paths; and a digital interface that feeds each of K segments divided from a sequence of N (N≤$N_{FFT}$) samples of the wireless signal of bandwidth $B_T$ to one of the K transmitting paths and/or receives a segment of samples from each of the M receiving paths which are to be concatenated with the segments from other receiving paths to form a sequence of N (N≤$N_{FFT}$) samples of the wireless signal of bandwidth $B_T$, wherein the length of each segment $N_k$ is proportional to the bandwidth $B_{Tk}$ of the path and the samples of each segment undergoes an $N_k$-point ITTD transformation and addition of Cyclic Prefix (CP) in a transmitting path and/or removal of CP and an $N_k$-point TTD transformation in a receiving path.

2. The apparatus in claim 1 wherein the signal bands of all the K transmitting paths and/or all the M receiving paths cover the entire or approximately the entire bandwidth $B_T$ centered at carrier frequency $f_c$.

3. The apparatus in claim 1 wherein the sum of all $N_k$ equals to $N_{FFT}$.

4. The apparatus in claim 1 wherein the $B_{Tk}$ of the K transmitting paths are equal, $N_k = N_{FFT}/K$, the carrier frequency and the signal band of the $k^{th}$ transmitting path are $$f_c - \frac{B_T}{2} + \frac{(2k-1)B_T}{2K}$$

of and $$\left[ f_c - \frac{B_T}{2} + \frac{(k-1)B_T}{K}, f_c - \frac{B_T}{2} + \frac{kB_T}{K} \right]$$

for k=1, ..., K; and/or the $B_{Tk}$ of the M receiving paths are equal, $N_k = N_{FFT}/K$, the carrier frequency and the signal band of the $k^{th}$ receiving path are $$f_c - \frac{B_T}{2} + \frac{(2k-1)B_T}{2M} \text{ and } \left[ f_c - \frac{B_T}{2} + \frac{(k-1)B_T}{M}, f_c - \frac{B_T}{2} + \frac{kB_T}{M} \right]$$

for k=1, ..., M.

5. The apparatus in claim 1 wherein the OSM is Orthogonal Frequency Division Multiplexing (OFDM) and the TTD and ITTD transformations are implemented as Fast Fourier Transform (FFT) and Inverse FFT (IFFT).

6. The apparatus in claim 1 further comprising the combiner and/or the splitter.

7. The apparatus in claim 1 wherein the K transmitting paths and/or the M receiving paths are implemented in an integrated circuit chip.

8. The apparatus in claim 1 further comprising a first digital processing module for each path that performs the ITTD and/or TTD and CP processing of each of the segments; and a second digital processing module that divides a sequence of N (N≤$N_{FFT}$) samples of the wireless signal of bandwidth $B_T$ into K segments for transmitting and/or concatenates M segments into a sequence of N (N≤$N_{FFT}$) samples of the wireless signal of bandwidth $B_T$ for receiving.

9. The apparatus in claim 8 wherein the K transmitting paths, the M receiving paths, the first and second digital processing modules, the combiner and the splitter are implemented in an integrated circuit chip.

10. The apparatus in claim 1 wherein n<K transmitting paths and/or m<K receiving paths are selected if the transmission bandwidth of the wireless signal is less than Br.

11. A method of wireless transmission and/or reception of a wireless signal of transmission bandwidth $B_T$ with carrier frequency $f_c$ using an Orthogonal or approximately orthogonal Subcarrier type of Modulation (OSM) with a Transformed Time Domain (TTD) transformation and its inverse ITTD size of $N_{FFT}$ comprising using K (K≥2) transmitting paths to transmit and/or M (M≥2) receiving paths to receive OSM signals, wherein the $k^{th}$, k=1 to K, transmitting path and/or $k^{th}$, k=1 to M, receiving path has a signal band with a bandwidth $B_{Tk} < B_T$ which is located next to the signal band(s) of the $(k-1)^{th}$ path and/or the $(k+1)^{th}$ path;

using a local oscillator (LO) to generate a carrier frequency for each path wherein the frequency of the LO of the $k^{th}$ path is the center frequency of the signal band of the $k^{th}$ path;

using an analog interface to feed the outputs of the K transmitting paths to a combiner that combines the K transmitting paths to produce a transmitting signal of bandwidth $B_T$ with carrier frequency $f_c$ and/or to receive the M signals from a splitter that divides a received signal of bandwidth $B_T$ with carrier frequency $f_c$ into M paths to feed into the M receiving paths; and using a digital interface to feed each of K segments divided from a sequence of N (N≤$N_{FFT}$) samples of the wireless signal of bandwidth $B_T$ to one of the K transmitting paths and/or to receive a segment of samples from each of the M receiving paths which are to be concatenated with the segments from other receiving paths to form a sequence of N (N≤$N_{FFT}$) samples of the wireless signal of bandwidth $B_T$, wherein the length of each segment $N_k$ is proportional to the bandwidth $B_{Tk}$ of the path and the samples of each segment undergoes an $N_k$-point ITTD transformation and addition of Cyclic Prefix (CP) in a transmitting path and/or removal of CP and an $N_k$-point TTD transformation in a receiving path.

12. The method of claim 11 wherein the signal bands of all the K transmitting paths and/or all the M receiving paths cover the entire or approximately the entire bandwidth $B_T$ centered at carrier frequency $f_c$.

13. The method of claim 11 wherein the sum of all $N_k$ equals to $N_{FFT}$.

14. The method of claim 11 wherein the $B_{Tk}$ of the K transmitting paths are equal, $N_k = N_{FFT}/K$, the carrier frequency and the signal band of the $k^{th}$ transmitting path are $$f_c - \frac{B_T}{2} + \frac{(2k-1)B_T}{2K}$$

of and $$\left[ f_c - \frac{B_T}{2} + \frac{(k-1)B_T}{K}, f_c - \frac{B_T}{2} + \frac{kB_T}{K} \right]$$

for k=1, ..., K; and/or the $B_{Tk}$ of the M receiving paths are equal, $N_k = N_{FFT}/K$, the carrier frequency and the signal band of the $k^{th}$ receiving path are $$f_c - \frac{B_T}{2} + \frac{(2k-1)B_T}{2M} \text{ and } \left[ f_c - \frac{B_T}{2} + \frac{(k-1)B_T}{M}, f_c - \frac{B_T}{2} + \frac{kB_T}{M} \right]$$

for k=1, ..., M.

15. The method of claim 11 wherein the OSM is Orthogonal Frequency Division Multiplexing (OFDM) and the TTD and ITTD transformations are implemented as Fast Fourier Transform (FFT) and Inverse FFT (IFFT).

16. The method of claim 11 further comprising transmitting the signal at the output of the combiner via an antenna, and/or feeding the signal from an antenna to the input of the splitter.

17. The method of claim 11 further comprising integrating the K transmitting paths and/or the M receiving paths in a circuit chip.

18. The method of claim 11 further comprising using a first digital processing module for each path to perform the ITTD and/or TTD and CP processing of each of the segments; and using a second digital processing module to divide a sequence of N ($N \leq N_{FFT}$) samples of the wireless signal of bandwidth $B_T$ into K segments for transmitting and/or concatenates M segments into a sequence of N ($N \leq N_{FFT}$) samples of the wireless signal of bandwidth $B_T$ for receiving.

19. The method of claim 11 further comprising integrating the K transmitting paths, the M receiving paths, the first and second digital processing modules, the combiner and the splitter in a circuit chip.

20. The method of claim 11 further comprising selecting n<K transmitting paths and/or m<K receiving paths if the transmission bandwidth of the wireless signal is less than $B_T$.

* * * * *